(12) United States Patent
Beekmann et al.

(10) Patent No.: US 9,279,411 B2
(45) Date of Patent: Mar. 8, 2016

(54) METHOD FOR OPERATING A WIND TURBINE

(75) Inventors: Alfred Beekmann, Wiesmoor (DE); Wolfgang De Boer, Moormerland (DE)

(73) Assignee: ALOYS WOBBEN, Aurich (DE)

(*) Notice: Subject to any disclaimer, the term of this patent is extended or adjusted under 35 U.S.C. 154(b) by 936 days.

(21) Appl. No.: 13/243,277

(22) Filed: Sep. 23, 2011

(65) Prior Publication Data

US 2012/0104756 A1 May 3, 2012

Related U.S. Application Data

(63) Continuation-in-part of application No. PCT/EP2010/053760, filed on Mar. 23, 2010.

(30) Foreign Application Priority Data

Mar. 23, 2009 (DE) .......................... 10 2009 014 012

(51) Int. Cl.
*H02P 9/00* (2006.01)
*F03D 7/02* (2006.01)
(Continued)

(52) U.S. Cl.
CPC ............ *F03D 7/0284* (2013.01); *F03D 7/0224* (2013.01); *F03D 7/048* (2013.01); *H02J 3/24* (2013.01); *H02J 3/386* (2013.01); *H02P 9/105* (2013.01); *F05B 2240/96* (2013.01); *F05B 2270/1033* (2013.01); *F05B 2270/1041* (2013.01); *F05B 2270/309* (2013.01);
(Continued)

(58) Field of Classification Search
CPC ..... Y02E 10/723; Y02E 10/725; H02J 1/102; H02J 3/36; H02J 9/062

USPC ....................... 307/153; 290/44, 55
See application file for complete search history.

(56) References Cited

U.S. PATENT DOCUMENTS 7,345,373 B2    3/2008  Delmerico et al.
7,372,173 B2 *  5/2008  Lutze et al. .................... 290/44
(Continued)

FOREIGN PATENT DOCUMENTS

CL          469-1987      5/1988
CN        1410669 A       4/2003
(Continued)

OTHER PUBLICATIONS

Jesper Runge Kristoffersen "The Horns Rev Wind Farm and the Operational Experience With the Wind Farm Main Controller", Copenhagen Offshore Wind 2005, Oct. 26-28, 2005, 9 pages.
(Continued)

*Primary Examiner* — Jared Fureman
*Assistant Examiner* — Alfonso Perez Borroto
(74) *Attorney, Agent, or Firm* — Seed IP Law Group PLLC

(57) ABSTRACT

The invention concerns a method of operating a wind power installation. The wind power installation has a circuit for measuring the frequency prevailing in the electrical supply network connected to a control device for controlling operation of the wind power installation. It is proposed that the power delivered by the generator of the wind power installation to the network is increased quickly and for a short period above the currently prevailing power of the wind power installation if the network frequency of the electrical network is below the desired target frequency of the network by a predetermined frequency value.

24 Claims, 9 Drawing Sheets

(51) Int. Cl.
*F03D 7/04* (2006.01)
*H02P 9/10* (2006.01)
*H02J 3/24* (2006.01)
*H02J 3/38* (2006.01)
*H02P 101/15* (2015.01)

(52) U.S. Cl.
CPC ....... *F05B2270/337* (2013.01); *H02P 2101/15* (2015.01); *Y02E 10/723* (2013.01); *Y02E 10/725* (2013.01); *Y02E 10/763* (2013.01)

(56) References Cited

U.S. PATENT DOCUMENTS

| | | | |
|---|---|---|---|
| 2007/0047163 A1 | 3/2007 | Lutze et al. | |
| 2007/0085343 A1* | 4/2007 | Fortmann | F03D 7/0264 290/44 |
| 2007/0120369 A1 | 5/2007 | Delmerico et al. | |
| 2008/0093857 A1* | 4/2008 | Stiesdal | F03D 7/0284 290/44 |
| 2009/0167021 A1* | 7/2009 | Andersen | F03D 7/0284 290/44 |
| 2009/0194995 A1* | 8/2009 | Delmerico et al. | 290/44 |
| 2010/0090532 A1* | 4/2010 | Shelton et al. | 307/46 |

FOREIGN PATENT DOCUMENTS

| | | |
|---|---|---|
| CN | 101054951 A | 10/2007 |
| DE | 10341504 A1 | 6/2005 |
| DE | 102005052011 A1 | 5/2007 |
| EP | 1 467 463 A1 | 10/2004 |
| EP | 1 790 850 A1 | 5/2007 |
| EP | 1 914 419 A1 | 4/2008 |
| EP | 1914419 A1 | 4/2008 |
| JP | 56-150999 A | 11/1981 |
| JP | 2006-296200 A | 10/2006 |
| JP | 2006-320198 A | 11/2006 |
| JP | 2008-278725 A | 11/2008 |
| RU | 2 073 310 C1 | 2/1997 |
| SU | 1163457 A1 | 6/1985 |
| WO | 94/27361 A1 | 11/1994 |
| WO | 00/73652 A1 | 12/2000 |
| WO | 01/86143 A1 | 11/2001 |
| WO | 0186143 A1 | 11/2001 |
| WO | 03/023224 A1 | 3/2003 |
| WO | 2008/040350 A2 | 4/2008 |

OTHER PUBLICATIONS

Mark Cardinal et al. "Grid Friendly Wind Plant Controls: WindCONTROL™—Field Test Results", Windpower 2006, Jun. 6, 2006, Pittsburgh, PA, 8 pages.
GE Energy, "WindINERTIA™ Control," Fact Sheet, Feb. 2009, 1 page.
"GE Energy Unveils WindINERTIA & WindLAYOUT," retrieved from http://www.renewableenergyworld.com/rea/news/article/2009/03/ge-energy-unveils-windinertia-windlayout, Mar. 19, 2009, 1 page.
Heier, S., "Grid Integration of Wind Energy Conversion Systems", 1998, 3 pages.
Altin et al., "Overview of Recent Grid Codes for Wind Power Integration," 12th International Conference on Optimization of Electrical and Electronic Equipment (OPTIM 2010), pp. 1152-1160, 2010.
Andresen et al., "Grid code and wind farm control requirements—What to control, why, where, and how," 7th International Workshop on Large Scale Integration of Wind Power and on Transmission Networks for Offshore Wind Farms, pp. 305-309, 2007.
Boëda et al., "Contribution of Wind Farms to Frequency Control and Network Stability," European Wind Energy Conference, France, pp. 1-10, 2007.
Conroy et al., "Frequency Response Capability of Full Converter Wind Turbine Generators in Comparison to Conventional Generation," *IEEE Transactions on Power Systems* 23(2):649-656, May 2008.
Courtecuisse et al., "Capacity of a variable speed turbine to participate in primary frequency control," 6th International Workshop on Large-Scale Integration of Wind Power and Transmission Networks for Offshore Wind Farms, pp. 201-210, Oct. 26-27, 2006.
de Alegria et al., "Connection requirements for wind farms: A survey on technical requirements and regulation," *Renewable and Sustainable Energy Reviews* 11:1858-1872, 2007.
EirGrid, "EirGrid Grid Code—Version 3.3," Jan. 30, 2009, retrieved from http://www.eirgrid.com/media/Grid%20Code%20v3.3.pdf, on Jun. 10, 2014, 315 pages.
Ekanayake et al., "Comparison of the Response of Doubly Fed and Fixed-Speed Induction Generator Wind Turbines to Changes in Network Frequency," *IEEE Transactions on Energy Conversion* 19(4):800-802, Dec. 2004.
Ekraft System, "Wind Turbines Connected to Grids with Voltages above 100 kV: Technical regulation for the properties and the regulation of wind turbines," Regulation TF 3.2.5, Transmission, Case No. 303, Doc. No. 214439 v3, Dec. 3, 2004, 34 pages.
Enercon, "WindBlatt," Enercon Magazine for wind energy, Issue 4, 2008, pp. 1-16, retrieved from http://www.enercon.de/p/downloads/WB-0408-en.pdf, on Jun. 10, 2014, 32 pages. (with English Translation).
Erlich et al., "WEA verändern dynamisches Netzverhalten: Dynamische Wechselwirkung zwischen Windparks and elecktrischem Verbundnetz: Dynamic interaction of wind farms with the electric power system," *EW* 101(20):60-65, 2002. (No English Abstract Available).
Hau, *Windkraftanlagen: Grundlagen, Technik, Einsatz, Wirtschaftlichkeit*, 4th Edition, Springer, pp. 380-383, 394, 506, 2003, 910 pages. (with English Abstract Only).
Hydra Québec TransÉnergie, "Transmission Provider Technical Requirements for the Connection of Power Plants to the Hydro-Québec Transmission System," Anlage E10, Feb. 2010, 93 pages.
Koch et al., "Dynamic Interaction of large Offshore Wind Farms with the Electric Power System," IEEE Bologna Power Tech Conference Proceedings, vol. 3, Jun. 2003, 7 pages.
Lalor et al., "Frequency Control and Wind Turbine Technologies," *IEEE Transactions on Power Systems* 20(4):1905-1913, Nov. 2005.
Meyer, "Distributed Generation: towards an effective contribution to power system security," IEEE Power Engineering Society General Meeting, Tampa, Florida, Jun. 24-28, 2007, 6 pages.
Morren et al., "Inertial response of variable speed wind turbines," *Electric Power Systems Research* 76:980-987, 2006.
Morren et al., "Wind Turbines Emulating Inertia and Supporting Primary Frequency Control," *IEEE Transactions on Power Systems* 21(1):433-434, Feb. 2006.
Prillwitz et al., "Primärregelung mit Windkraftanlagen," ETG-Workship "Neue dezentrale Versorgungsstrukuren" 19, pp. 1-6, Feb. 20, 2003.
Salaberri et al., "Wind farms and conventional plants primary frequency control interaction," EWEC 2007, retrieved from http://www.ewea.org/ewec2007/allfiles2/209_Ewec2007fullpaper.pdf, on Jun. 10, 2014, 6 pages.
Sørensen et al., "Modeling of wind farm controllers," EWEC, Athens, Feb. 27-Mar. 2, 2006, 9 pages.
Sørensen et al., "Wind farm controllers with grid support," Proceedings of COW 2005, pp. 158-165, 2005.
Sørensen et al., "Wind power plants—status and visions," Technologies for sustainable energy development in the long term, Proceedings, Denmark, Forskningscenter Risoe., No. 1517(EN), pp. 259-271, 2005.
Ullah et al., "Temporary Primary Frequency Control Support by Variable Speed Wind Turbines-Potential and Applications," *IEEE Transactions on Power Systems* 23(2):601-612, May 2008.
Walling et al., "Advanced Wind Plant Controls to Enhance Grid Integration," 6th International Workshop on Large-Scale Integration of Wind Power and Transmission Networks for Offshore Wind Farms, pp. 193-197, Oct. 26-28, 2006.

* cited by examiner

METHOD FOR OPERATING A WIND TURBINE

BACKGROUND

1. Technical Field

The invention concerns a method of operating a wind power installation and a wind power installation for carrying out the method.

2. Description of the Related Art

As state of the art attention is directed in particular to 'Grid Integration of Wind Energy Conversion Systems', Siegfried Heier, 1998, therein in particular pages 263 and so forth as well as U.S. Pat. No. 7,345,373 and WO 01/86143.

The most relevant state of the art is document WO 01/86143.

That document discloses the teaching of reducing the power of a wind power installation when the network frequency, that is to say the frequency of the network into which the wind power installation feeds its electrical power, exceeds a given value above the target frequency.

In the case of Central European networks the target frequency is usually at 50 Hz whereas in the case of US networks it is at 60 Hz. The network is also referred to as the grid or power grid.

At the same time however there are also sometimes slight network frequency fluctuations which are dependent on how greatly the ratio of the power produced by the energy producers connected to the electrical network is balanced out in relation to the power taken by the consumers, that is to say those who are connected to the electrical network and take electrical energy in order therewith to operate any electrical equipment.

If, for example, the power supply from the generators is above that which the consumers connected to the network are taking in terms of power, the network frequency rises. Conversely the frequency can also fall below the target frequency, for example below 50 Hz, if the power supply offered is less than that which is being taken by the electrical consumers connected to the network.

Network management, that is to say the management of producers and also large consumers, is usually implemented by the network operators. In that case network management can provide quite different regulating mechanisms, for example for automatically switching on certain generators (for example gas fired power stations), automatic switch-off of given large consumers or also the use of pumped storage plants and the like. In normal operation even the network management of large supply networks constantly succeeds in keeping the network frequency in the region of the target frequency, in which respect minor deviations are certainly allowed. Those minor deviations however should generally not exceed the region of ±0.1%. It will be appreciated that the network management can also involve switching on further networks which are connected to the network in order thereby to feed additional power into the network or to take it from the network and feed it into other networks.

For wind power installations, document WO 01/086143—as already stated above—already teaches reducing the power below the currently available power if a given network frequency value is exceeded, for example a value which is 3‰ above the target value of the network frequency (for example over 50 Hz).

The document, WO01/086143, further teaches that, if the frequency continues to rise, the power is linearly further reduced, in dependence on the further rise in the network frequency.

BRIEF SUMMARY

One object of the present invention is to improve the operation of a wind power installation in comparison with the state of the art and overall to improve the network support of the wind power installation with respect to the network.

One way to achieve that object is attained by a method having the features of claim 1. Advantageous developments and further embodiments are described by the appended claims.

According to the invention the wind power installation is not switched off on the initial fall of a given frequency value below the target value of the network frequency, but the wind power installation continues to be operated, with an increased power. Quickly, and for a short period, the power is higher than the power which was previously fed into the network. For that purpose for example the rotational energy stored in the moment of inertia of the rotor and generator system is used, that is to say more power is taken briefly from the entire rotor and generator system so that an increased level of power is quickly available immediately upon the network frequency falling below the predetermined target value. This delivery of increased power can also occur when the wind power installation had previously fed in at rated power, that is to say it had delivered its normal maximum amount, namely all the power that it can take from the wind under normal operating conditions.

The amount by which the power is quickly increased is in a range of up to 10 to 30% of the rated power, preferably about 20% of the rated power.

The predetermined frequency value can be established in one example by presetting a deadband frequency. As soon as the network frequency is below that deadband frequency, the currently prevailing output power of the wind power installation is raised and the power delivered by the wind power installation, and fed into the network, is also raised. The deadband frequency is selected to be below the desired target frequency of a network by the predetermined frequency value.

The predetermined frequency value is preferably greater than 0.1%, 0.2% or 0.3% of the network target frequency, according to respective alternative embodiments. In the case of a 50 Hz network target frequency therefore the system detects when the value falls below the frequency of 49.95 Hz, 49.90 Hz and 49.85 Hz respectively.

Alternatively, or in addition, a relative frequency change can also be considered, that is to say a relative frequency drop also denoted by df/dt or a frequency gradient. If the magnitude of such a network frequency change in relation to time is excessively great and therefore the frequency falls excessively quickly the power which is currently to be fed into the network can be briefly increased to support the network. Detecting such a frequency change in relation to time, that is to say df/dt, may make it possible to more rapidly detect a network frequency drop and thus possibly permits faster recognition of the need for network support. Detection of an absolute frequency value, that is to say when the value falls below an absolute predetermined frequency value, and also the change in relation to time, can also be combined. Thus for example it is possible for a fast network frequency drop to be assessed as less critical if the absolute value of the network frequency is above the rated frequency.

If in addition or also as an alternative a frequency gradient is detected, it has proven to be desirable to provide for a power increase as from a gradient of 0.1 Hz/s. An amount of change, that is to say a gradient of 0.2-7 Hz/s, in particular 0.5-2 Hz/s, has proven to be an advantageous range for initiating a power increase. Thus for example 0.2 Hz/s, 0.5 Hz/s, 1 Hz/s, 2 Hz/s and 5 Hz/s are advantageous values. It is to be noted that the detection of a frequency gradient of for example 1 Hz/s usually does not presuppose any measurement over the period of an entire second. Rather, measurement times of 20 ms and less, in particular 10 ms, are suitable measurement times. Shorter measurement times of for example 5 ms or even shorter are also preferred values. In addition both the measurement time and also the underlying amount of change or the underlying frequency gradient can depend on the network target frequency. The above-mentioned values for the frequency gradient and the measurement times provided for same relate to a 50 Hz target frequency. In the case of a 60 Hz target frequency a somewhat greater gradient and/or a somewhat shorter measurement time can possibly be provided.

It is also to be mentioned that the short-term power increase can also be used to stabilize or smooth the network frequency or to damp frequency fluctuations. In particular damping of frequency fluctuations can advantageously take account of the frequency gradient.

Preferably the short-term power increase is effected, utilizing the rotational energy stored in the moment of inertia of the rotor/generator system. That therefore concerns taking kinetic energy which is stored both in the rotating rotor which has one or more rotor blades, and also in the rotating rotor member of the generator. Taking a higher amount of power can be implemented in particular by increasing the exciter current and thus by increasing the generator counter-moment of the generator rotor member. In particular gearless generators with rotor members of large diameter and thus large masses and correspondingly large moments of inertia can store a considerable amount of kinetic energy.

Preferably the frequency of the power fed into the network always corresponds to the currently prevailing network frequency. If therefore the network frequency drops, a power increase can be effected, in which case however the frequency of the feed into the network is reduced, adapted to the currently prevailing frequency.

Preferably there is proposed a method characterized in that the increase in the power is effected above the currently prevailing power, that is to say also above the rated power, when previously the feed into the network was with rated power. Therefore, even when the wind power installation is operated in the rated mode, a power increase is effected upon a critical drop in frequency. In that respect, it was realized that a rated power which can usually also represent a maximum power at any event for ongoing operation can be exceeded for short-term network support without damage to the wind power installation.

In an embodiment it is proposed that the method is characterized in that within a period of 10 to 1000 ms, in particular 20 to 500 ms, preferably 50 to 100 ms, after the frequency value falls below the predetermined frequency value of the network frequency or after the predetermined amount of change is exceeded the power increase to the network is effected. The feed to the network from the wind turbine is effected with an increased power, that is to say a power which is above the previously supplied power, for a period of time of at least 0.5 sec, preferably at least 1 sec to a maximum of 30 sec. Preferably the power is increased for a set amount of time, such as at about 3 to 6 seconds or, 8, 10, 12 or 15 seconds. In principle a reaction time which is as short as possible, of for example 10 ms, is to be viewed as an preferred value for implementing an increase in power. In particular the time of 10 ms corresponds to a half-wave at a network frequency of 50 Hz. A longer response time of up to 1 sec is desirable to prevent an over-reacting or indeed unstable system. In particular, reaction time values of 50 to 100 ms have proven to be an advantageous compromise.

The power increase is required in principle for a short period of time. That period of time usually lasts for at least 0.5 sec but preferably 1 sec and goes up to 3, 6, 8, 10, 12, 15 and a maximum of 30 sec. If an increased power feed of more or markedly more than 10 sec is required, that is no longer generally to be viewed as an instantaneous support measure, but rather an increased power requirement. An effective range for the power increase has proven to be at 3 to 6, 8, 10, 12 or 15 sec.

Preferably there is provided a method of controlling a wind park in which each wind power installation is controlled in accordance with a method according to the invention. In particular each wind power installation is adapted to deliver an increased level of power to the network in the case of a frequency dip. In that respect a wind park includes at least two wind power installations but usually markedly more installations like 10 wind power installations, 50 wind power installations or even more. Among all wind power installations in the wind park however only those which are also involved in the described method are to be considered.

Preferably in this case too the increase in the power delivered to the network from all wind power installations is effected in unitary and/or central relationship. On the one hand that prevents different installations of a wind park responding at different times and possibly impeding each other. In addition wind parks can be subject to certain conditions such as limit values for coupling to the network if the wind park feeds the power of all wind power installations into the network at a network connection location. Thus for example upper limits for the power fed into the network on the part of the connection line can however possibly also be preset when using a central transformer for same. A central control can take account of such boundary conditions. Sometimes a unitary control of the wind power installations can be helpful, if that is possible with different wind power installations in a wind park. Thus it is possible to implement at least partially unitary control for example in regard to the response times and/or periods of the power increase. If for example in a situation where all or most wind power installations of a wind park are in the rated mode of operation a power increase of all wind power installations should be limited because of a power feed upper limit for the wind park, the control can be effected in such a way that firstly a group of the wind power installations contribute to a power increase and thereafter another group of the wind power installations do so. In addition the level of control and regulating complication and expenditure can be reduced by a central control unit which only delivers the corresponding power target values to each wind power installation in the wind park for example for a power increase. For example, in a case where a wind park includes 50 wind turbines, if the frequency dips then 10 of the wind turbines can provide increased power. Then, if 3 to 6 seconds have passed and the frequency has returned to normal, no further action need be taken. But, if 3 to 6 seconds pass and the frequency is still below the threshold value, then another set of 10 wind turbines of the 50 can provide increased power. Then, if another 3 to 6 seconds pass and the frequency is not restored to the proper value, another 10 wind turbines can provide increased power, and so on.

In addition there is proposed a wind power installation adapted to use a method according to the invention. Furthermore there is proposed a wind park which includes a plurality of wind power installations according to the invention and preferably uses a central control method and/or in which the increase in the power of the wind power installations, that is to be delivered to the network, is at least partially unitarily controlled. Central control for the increase in the power to be delivered to the network from all wind power installations can be implemented by a separate central control unit and/or a wind power installation can function as a master so that the other wind power installations depend on that installation. In principle it is also possible for a wind park to be divided into a plurality of park portions, in regard to control procedures, in order for example to bundle together installations of the same or a similar type in each case, in terms of control procedures.

To increase the power delivery, not only is utilization of the rotational energy of the moment of inertia considered, but also as a support or possibly exclusively, it is possible to effect a change in the setting angle of the rotor blades—a change in the pitch angle, referred to as pitching—to increase the wind yield. That is effected in particular when the wind power installation is running under rated load, that is to say is already delivering rated power, and in particular the rotor blades have already been partially pitched to regulate the rated rotary speed.

After a power increase the speed of rotation of the rotor can have reduced because kinetic energy has been taken. Particularly in the event of a power increase in the case of a rated load mode of operation, such a reduction can however be less or may not occur at all. A reduction in rotary speed is to be expected in particular in the part-load range and then depends on the level and duration of the power increase, that is to say the power which is additionally delivered.

BRIEF DESCRIPTION OF THE SEVERAL VIEWS OF THE DRAWINGS

The invention is described in greater detail hereinafter by means of embodiments by way of example with reference to the accompanying Figures.

DETAILED DESCRIPTION

Hereinafter identical references can denote identical components but also components which are similar and not identical. Hereinafter, for the sake of completeness, a wind power installation having a synchronous generator and a gearless design with a full-wave converter is described.

Figure 1:
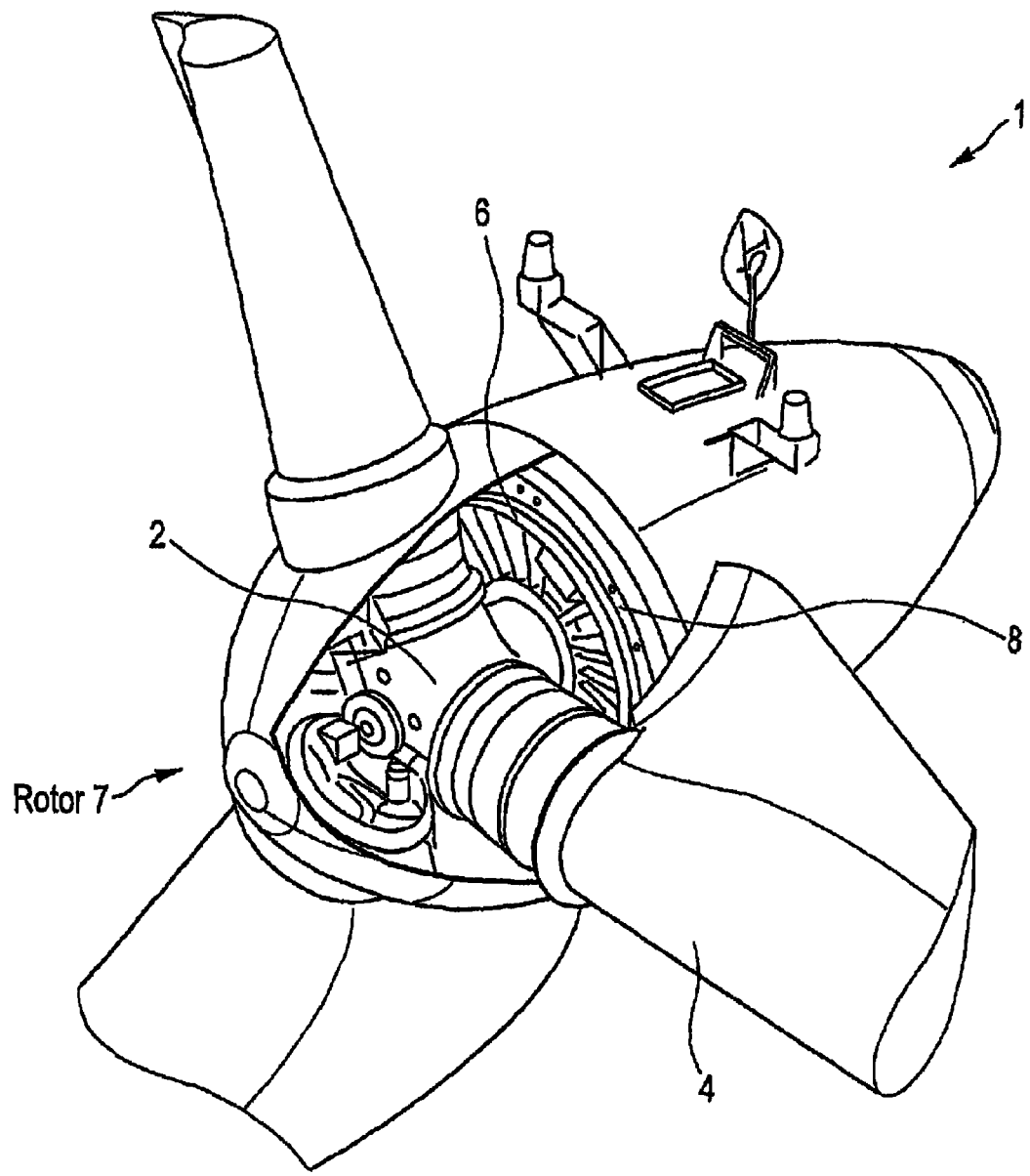
FIG. 1 diagrammatically shows a partly opened pod of a wind power installation with a diagrammatic view of the hub and parts of the generator, FIG. 2 diagrammatically shows an overview with a gearless rotor/generator coupling arrangement with frequency measurement.

FIG. 1 diagrammatically shows a pod 1 of a gearless wind power installation. The hub 2 can be seen by virtue of the housing, also called the spinner, pod or nacelle, being shown partly open. Three rotor blades 4 are fixed to the hub, the rotor blades 4 being shown only in their region near the hub. The hub 2 with the rotor blades 4 forms an aerodynamic rotor 7. The hub 2 is mechanically fixedly connected to the generator rotor 6, which can also be referred to as the rotor member 6 and is referred to hereinafter as the rotor member 6. All parts that rotate are referred to herein jointly as the rotor assembly. The rotor member 6 is mounted rotatably with respect to the stator 8.

During its rotation relative to the stator 8 the rotor member 6 is supplied with current, usually a direct current, in order thereby to generate a magnetic field and build up a generator moment or generator counter-moment which can also be suitably set by that exciter current and can be altered. When the rotor member 6 is thus electrically excited its rotation relative to the stator 8 produces an electrical field in the stator 8 and thus an electrical alternating current.

In the example just described, the exciter current is in the rotor. Of course, the generator can be of the type in which the exciter current is in the stator and still fall within the scope of this invention.

Figure 2:
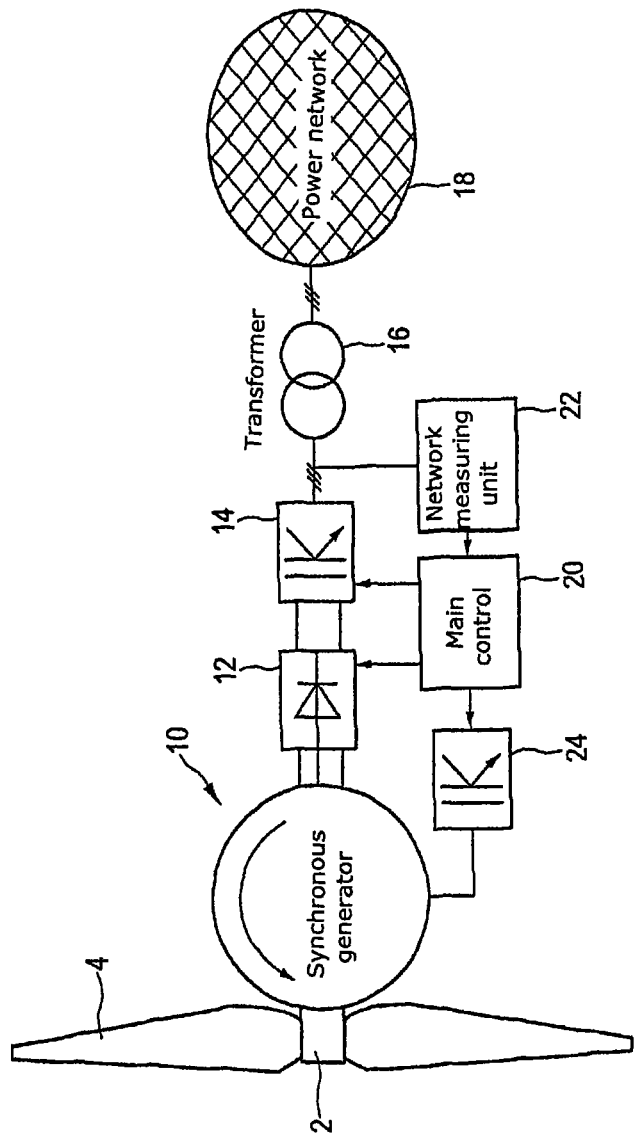

The alternating current produced in the generator 10 which is substantially made up of the rotor member 6 and the stator 8 is rectified by way of a rectifier 12, in accordance with the structure shown in FIG. 2. The rectified current or rectified voltage is then converted by means of an inverter 14 into a 3-phase system at the desired frequency. The three-phase current-voltage system produced in that way is stepped up in particular in voltage by means of a transformer 16 to be fed into a connected power network 18. In some systems, it would be possible to omit the transformer or to replace it by a choke. Usually however the voltage requirements in the network 18 are such that it is necessary to step it up by means of a transformer.

Control is effected by using a main control 20 which can also be referred to as the main control unit and which forms the highest-level regulating and control unit of the wind power installation. The main control 20 acquires its information inter alia about the network frequency from the subordinated network measuring unit 22. The main control 20 controls the inverter 14 and the rectifier 12. It will be appreciated that in principle it would also be possible to use an uncontrolled rectifier. In addition the main control 20 controls a direct current setting member 24 for feeding the exciter current into the rotor member 6 which is part of the generator 10. The main control 20 modifies inter alia the power feed into the network or the working point of the generator when the network frequency falls below a predetermined network frequency limit value. As the generator is operated in rotary speed-variable fashion the feed into the network is effected as described with a full-wave converter formed substantially by the rectifier 12 and the inverter 14.

In operation the network voltage and the network frequency is permanently subjected to three-phase measurement by the network measuring unit 22. A new value for one of the three phase voltages is afforded from the measurement operation every 3.3 ms—in the case of a network frequency of 50 Hz. The network frequency is thus detected each voltage half-wave, filtered and compared to the preset limit values. For a 60 Hz system, a value for one of the three phase voltages would be available approximately for every 2.7 ms, more specifically approximately at each zero crossing.

Figure 3:
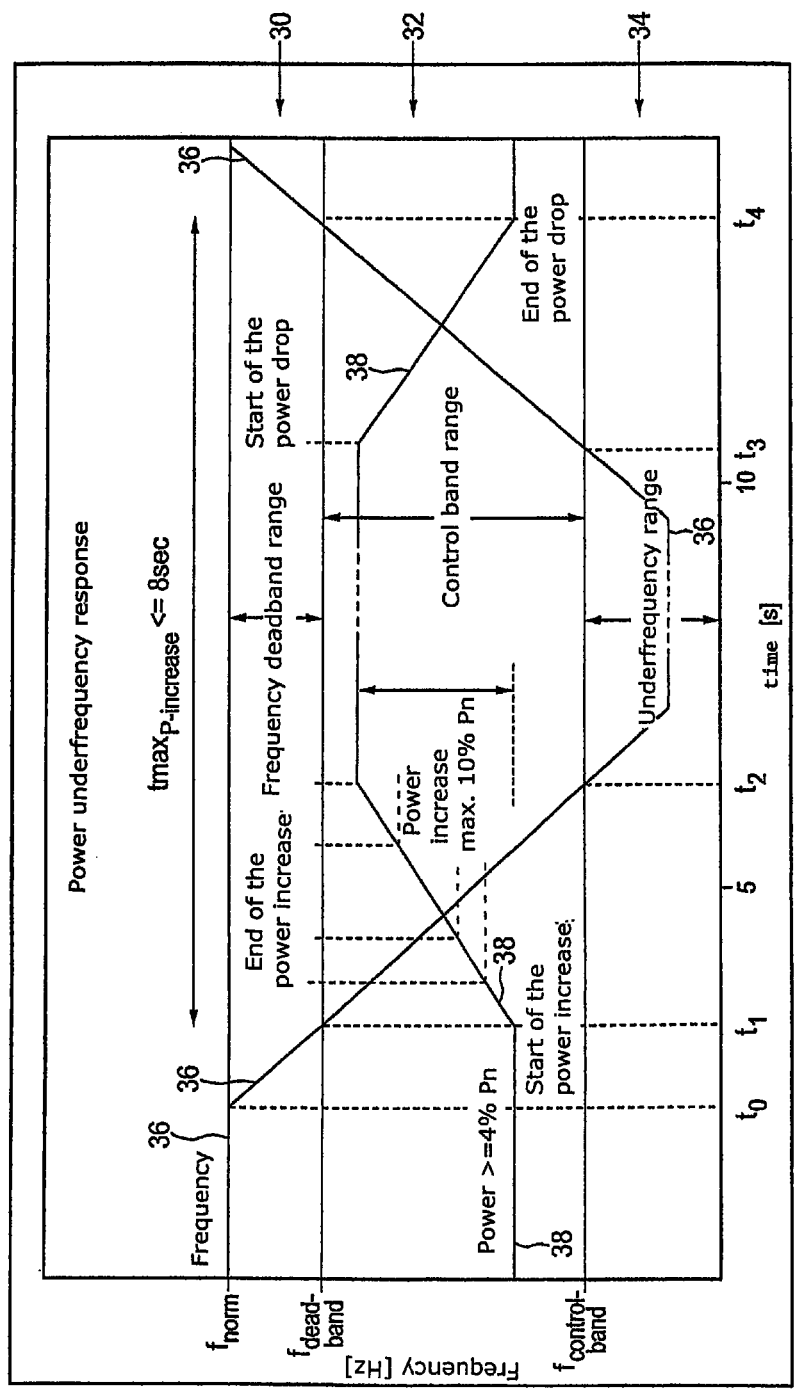
FIG. 3 shows an embodiment by way of example of a power/frequency characteristic of a wind power installation.

FIG. 3 shows a diagrammatic example of a frequency configuration and frequency ranges in relation to time, also showing an associated power configuration.

It will be seen from FIG. 3 that the main control distinguishes in respect of frequency between three operating ranges, mainly the deadband range 30, the control band range 32 and the underfrequency range 34. The deadband range is the frequency range between the rated frequency $f_{norm}$ or $f_N$ and the deadband frequency $f_{deadband}$ therebeneath. The rated frequency is usually fixedly predetermined such as for example 50 Hz for the European network system or 60 Hz in the US area. The deadband frequency $f_{deadband}$ can be adjusted whereby the deadband range can at any event be adjusted in relation to that lower limit. No power increase is provided in the deadband range.

The control band range 32 extends between the deadband frequency $f_{deadband}$ and the subjacent control band frequency $f_{controlband}$. The control band range can be suitably set by predetermining both the deadband frequency $f_{deadband}$ and also the control band frequency $f_{controlband}$. In the control band range, that is to say when the actual frequency assumes values in the control band range, an increase in the effective power can be effected in dependence on the frequency deviation, more specifically in particular the actual frequency from the deadband frequency, by a power increase $P_{increase}$. In that case there is an effective power increase which is dependent in particular proportionally on the frequency deviation. Thus the effective power increase $P_{increase}$ is also a variable parameter of the control band range. There can thus be an increase in the effective power in dependence on the frequency deviation by an additional power $P_{increase}$ of 0% to a preset value $P_{increase\_set}$. The maximum increase in the effective power can be preset by means of $P_{increase\_set}$, wherein $P_{increase\_set}$ can be increased from 0% to $P_{increase\_max}$ in 1% steps.

The underfrequency range 34 extends downwardly from the control band frequency $f_{controlband}$. When the actual frequency is below the control band frequency $f_{controlband}$ then the maximum preset power increase is implemented in the underfrequency range. The power increase $P_{increase}$ thus assumes the maximum value which can be for example 10% of the rated power.

FIG. 3 shows in bold the configuration by way of example of the actual frequency. The configuration of the actual frequency is identified by reference 36. The frequency initially has the value of the rated frequency $f_{norm}$ which it should hold for long periods of time. If there is a sudden power drain or other problem in the network, the frequency may drop away at the time $t_0$. A configuration by way of example of a power to be set is also identified by reference 38.

An electric power network, also called the power grid, normally has a variety of power producing and power control systems in place. For example, the standard power network includes nuclear power generators, coal-fired plants, hydro generators, natural gas-fired plants, and oil-fired plants, as well as wind turbines and other power generators, all of which place power onto the network.

It is quite important that the network frequencies stay very close to the target value because all of these power generators are producing power at the set frequency, such as 50 Hz. If the network frequency begins to fall slightly, in to the deadband of FIG. 3, other power generators or systems may take action to correct this frequency. For example, a nuclear power generator or hydro plant may increase their power output or take other steps to return the frequency to exactly 50 Hz. Thus, in many instances, the frequency will fall into the deadband and then within a short period of time, less than 1 second, be brought back to the normal frequency where it will stay for long periods of time. Thus, under most circumstances, the frequency will not fall below the deadband because the frequency is kept at or near the normal value by other power systems coupled to the network.

In the event a major power disruption occurs, the frequency may fall below the deadband zone established for the wind turbines as shown in FIG. 3. It is to be expected that if this occurs, other power generators and controls in the network are making an effort to return the frequency to $f_{normal}$. Once the frequency drops below $f_{deadband}$, wind turbines, according to this invention, will supply more power in an effort to bring the frequency back up to a normal value, $f_{normal}$. Usually, the frequency 36 will dip below $f_{deadband}$ for only a short period of time and due to increased power provided by the wind turbines, the frequency 36 will return to $f_{normal}$ and not continue down as shown in FIG. 3. It is, thus, to be understood that the example for the frequency 36 curve in FIG. 3 is to show the range of possible examples that the frequency 36 may pass through and is not a normal operational condition.

It is to be noted that the power produced by the wind turbine should be at least 4% of the rated power for that wind turbine before the control described herein, by way of example, before it will carry out the desired power increase described herein.

The actual frequency 36 drops away at the time $t_0$, but is firstly in the deadband range 30 so that no power increase takes place. The actual power being produced which is at least 4% of the rated power, therefore initially remains constant. At the time $t_1$ the actual frequency 36 reaches the deadband frequency $f_{deadband}$ and falls below same. In the illustrated example the power 38 rises linearly with the further drop in the frequency 36. That is to say the power increase $P_{increase}$, namely the respective increase with respect to the initial value $P_A$, is here proportional to the difference between the actual frequency 36 and the deadband frequency $f_{deadband}$. The proportionality factor is so set here that the power increase $P_{increase}$ reaches its maximum value of 10% of the rated power $P_n$ when the frequency reaches the control band frequency $f_{controlband}$. That is the case at the time $t_2$. The power increase $P_{increase}$ can thus be specified in principle for the control band range with: $P_{increase}=P_{increase\_set} \times P_N \times (f_{deadband}-f)/(f_{deadband}-f_{controlband})$, insofar as further boundary conditions like also maximum times are observed for a power increase.

If the frequency 36 falls further below the control band frequency $f_{controlband}$ the power 38 cannot be further increased and thus from the time $t_2$ firstly remains at a maximum value, namely the initial value plus the maximum value of $P_{increase}$, namely +10% of the rated power. If the frequency now rises again and at time $t_3$ exceeds the value of the control band frequency $f_{controlband}$, the power increase is thus also reduced again until the frequency 36 rises at the time $t_4$ above the deadband frequency $f_{deadband}$. At that time $t_4$ the power has then reached the initial value $P_A$ again and does not fall any further.

It is to be emphasized that FIG. 3 shows an idealized configuration and any regulating dynamics are initially disregarded. As already noted, in actual operation, the frequency 36 will often return to the normal value after a short time has passed. In addition, in the stated example—contrary to the diagrammatic view—the maximum time for which the power is increased should not exceed 8 sec. It is precisely in the case of smaller power increases however that a prolongation of that time can possibly be considered. It is to be observed that the linear frequency drop and linear frequency rise shown in FIG. 3 were selected to illustrate the control diagram and do not necessarily coincide with a frequency characteristic which is usually to be expected in actual operation of a power supply network.

FIG. 3 shows a diagram illustrating the configuration of the network frequency and as the reaction thereto the variation in the power feed from a wind power installation.

It is moreover to be seen that, at a given time $t_1$, the network frequency dips and more specifically below a given frequency value below the target frequency of about 50 Hz. If the frequency falls below a frequency value of for example 0.1% below the target value (and falls still further) the power of the wind power installation is increased above its currently prevailing value, for example by 20% of the currently prevailing power or by up to 30% above the rated power, practically instantaneously, that is to say in an extremely short time and for a short period, that is to say within a few ms, for example 50 to 100 ms or also 500 to 1000 ms, to name a further example. The example in FIG. 3 is based on an increase by 10% in the rated power. In the extreme case, when the power is just 4% of the rated power and is increased to 10% of the rated power, at least theoretically it would be possible to implement a power increase by 2.5 times the current power. That can be justified inter alia on the basis that, even with a low power delivery, a comparatively high rotary speed and thus a correspondingly large amount of rotational energy is already stored. Thus for example at 4% rated power it is already possible to reach a rotary speed of about 50% of the rated speed.

If many wind power installations behave as described hereinbefore then a large amount of additional power is very quickly made available, with the consequence that the producer/consumer imbalance is very quickly compensated, with the further consequence that the network frequency rises further very quickly and even quickly exceeds its target value.

In the illustrated embodiment the increased power feed into the network is effected only for about 2 to 10 sec, preferably only about up to 3 sec, depending on how the frequency behaves.

If for example the frequency rises very quickly again then the increased power feed can also be rather reduced again and concluded while in contrast the increased power feed is effected for longer if the underfrequency power feed remains for a longer period of time.

Figure 4:
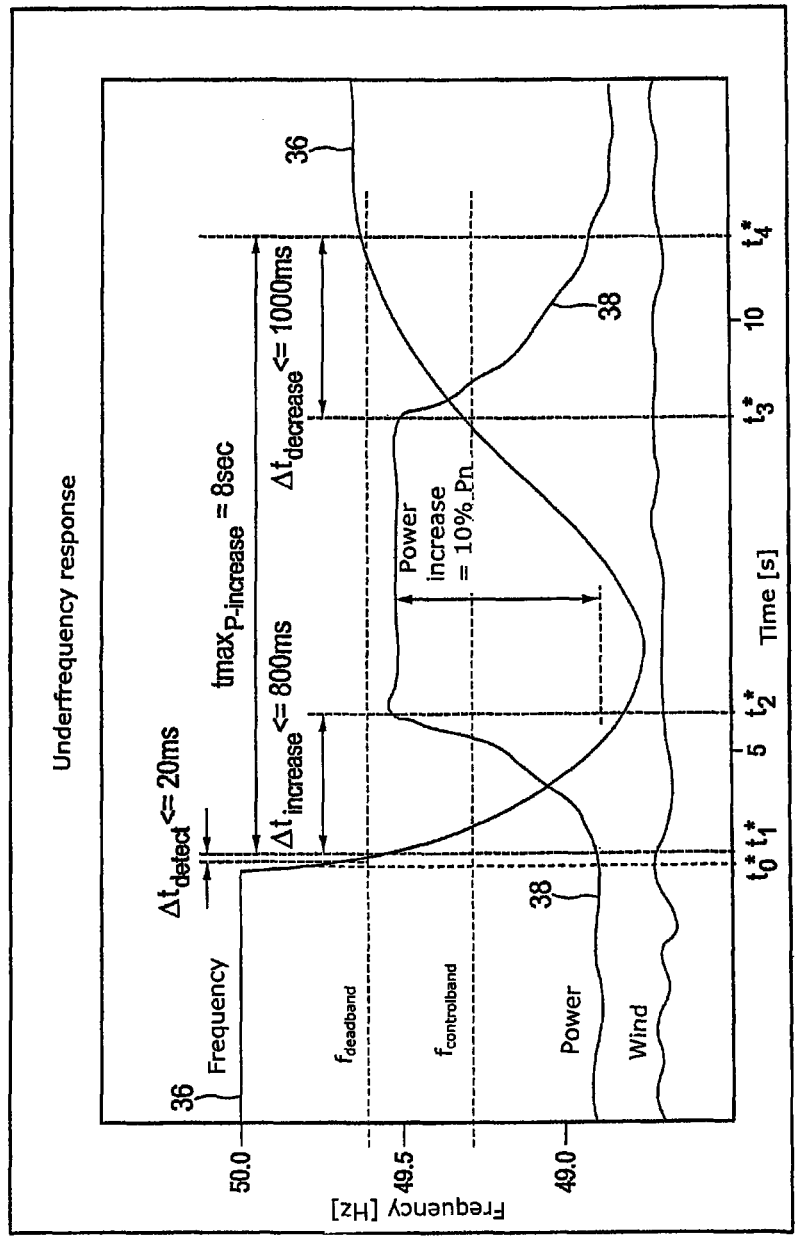
FIG. 4 shows an alternative embodiment to FIG. 3.

FIG. 4 also shows the increased power feed for the situation in which the power fluctuates, for example because the wind overall is fluctuating. In addition FIG. 4 also otherwise concerns a configuration based on a behavior which is really to be expected.

The frequency 36 is firstly at the rated frequency, namely 50 Hz. At a time $t_0^*$ the frequency 36 then falls off very quickly and also quite soon falls below the deadband frequency $f_{deadband}$. FIG. 4 admittedly also involves the situation where the frequency falls below the deadband frequency, but that is detected only after the frequency has fallen below the selected deadband frequency after a detection time $\Delta t_{detect}$, wherein that detection time is at a maximum 20 ms. The underfrequency is thus detected at time $t_1^*$ as shown in FIG. 4 and the power 38 is thereupon increased. An increase time $\Delta t_{increase}$ of $\leq 800$ ms elapses up to the maximum power increase of $P_{increase}$ of 10% rated power above the power still prevailing at the time $t_1^*$. When the frequency falls below the selected deadband frequency $f_{deadband}$ the main control, by virtue of internal control functions, provides for a power increase $P_{increase}$ of a maximum of 10% of the rated power of the wind power installation from the generator for a preset time $t_{max}$. The recognition time for the underfrequency is less than 20 ms. The level of the additional power $P_{increase}$ is proportionally dependent on the set maximum permissible power increase and the frequency deviation. The power is increased with a fixed gradient of about 250 kW/s—insofar it is considered at any event on the basis of the frequency deviation. In that way, in the case illustrated here, a power increase to the maximum value of a maximum of 10% of the rated power of the wind power installation is achieved in ≤800 ms. The power increase $P_{increase}$ is available over a time of a maximum of 8 sec. After at the latest 8 sec, the effective power of the wind power installation in the illustrated example is restored at about 250 kW/s to the normal, in particular previous working point.

Therefore, viewed from the time $t_1^*$, the maximum power increase is thus achieved after about 800 ms at the time $t_2^*$. The maximum increased power which is now set is held until the time $t_3^*$ in order then to gradually fall again until the time $t_4^*$ to approximately the initial value or, in dependence on wind, to a new value. The time from $t_1^*$ to $t_4^*$, which can also be referred to as $tmax_{P-increase}$, is a maximum of 8 sec for the illustrated example. It is to be noted that FIG. 4 is also a diagrammatic view and precise values including precise time values cannot be exactly read off therein.

It is to be observed that the frequency 36 rises again during the power increase, in particular after the time $t_2^*$, and this can also be attributed to the power increase, that is to say to the power which is additionally fed into the network. Nonetheless that crucially depends on the respective network and the respective wind power installation, and in particular on whether still further wind power installations implement such a power feed into the network. Incidentally in the illustrated example however the frequency does not rise to the rated frequency again within the power increase range. Nonetheless, by virtue of the maximum time achieved, the power increase is reduced and concluded.

For the increased power feed into the network, the wind power installation according to the invention uses the rotational energy stored in the rotating system comprising the rotor/generator, by virtue of the moment of inertia. In other words, due to the additional amounts of power taken off, above what is actually predetermined by the power characteristic of the wind power installation, the overall rotor/generator system admittedly continues to rotate, but it loses rotational energy and thus, after the increased power feed into the network, rotates more slowly than previously because more power was taken from the overall system than was delivered by the wind.

A brief description of how instantaneous power is added to the network based on the inertia stored in the rotor assembly will aid in understanding the operation of the invention. A wind turbine has the benefit that a rapid increase in the exciter current can extract some of the rotational inertia from the rotating parts of the system as will now be explained.

As shown in FIGS. 1 and 2, the rotor blades 4, rotor 2 and rotor member 6 constitute a large rotating mass, referred to herein as the rotor assembly. This assembly rotates based on the wind speed, receiving power from the wind to turn the blades, which causes rotation of the rotor assembly. As the wind speed increases, more power is applied to the blades and the rotation speed can increase. Power is extracted from the rotation by applying the exciter current from the setting member 24 under control of main control 20. As more exciter current is applied by member 24, more power is extracted from the rotating blades. Applying more exciter current to the rotor member 6 to extract more power creates a greater force to oppose rotation of the rotor and thus requires more force from the wind to turn the blades. With high wind speeds above a certain value, the wind turbine generates the maximum designed value of power for the wind turbine, also called herein the rated power.

During most times of operation, the wind turbine will not be generating power at the rated power value, but rather will produce power based on a wind speed less than the highest value. Under light wind speeds, the wind turbine may generate only 10% of the rated power, at moderate wind speeds it may generate power at 50% of the rated power and under high wind conditions, will generate power at 80% of the rated power. The time periods during which a wind turbine is operating at rated power will occur only with wind speeds above a certain value.

For a constant wind speed, the exciter current will normally remain constant so that the RPM of the wind turbine remains constant. If the exciter current is rapidly increased, this will extract a large surge of power from the wind turbine but the power will come from the inertia of the rotor assembly, namely, from the rotor blades 4, the rotor 2 and rotor member 6 since the wind speed has not changed. This will cause the rotor assembly to slow down. If the exciter current is placed very high and remains there for a long period of time, all of the inertia of the rotating components, namely, the rotating blades 4, rotor 2 and rotor member 6 will be converted to electric power and the blades will stop turning. This will have the benefit of placing a huge surge of power onto the network, equal to the total inertia of all the rotating components, but with the downside that the RPM will go to zero. This is usually not desired, rather, it is usually preferred to only slow one particular turbine down by some amount, such as half its current RPM and if more power is needed then to take some of the needed power from other wind turbines in the same or other wind parks. The increased exciter current is therefore only applied for a short period of time, such as 3 to 6 seconds, to any one wind turbine so that the RPM does not go to zero, and while it will slow the speed of that particular turbine, the exciter current is returned to a lower value so that the RPM can return to its prior value based on the power from the wind. If more instant power is still needed by the network, another set of wind turbines in the wind farm can have some of the inertia in their rotor assemblies converted to electric power.

The amount of power produced from any rotating wind turbine can be suddenly increased by a large amount for brief periods of time, even if the wind speed has not changed. If the wind turbine is rotating in a light wind and producing power at 10% or 20% of its rated power, the exciter current can be rapidly increased, causing the wind turbine to produce between 50% to 150% more power for a brief period of time. Similarly, if the wind turbine is producing at its rated power, namely, its maximum designed power output, it is still possible, for brief periods of time by a rapid increase in the exciter current, to extract an additional 10% to 30% more power from the wind turbine by using the inertia of the rotor assembly for electric power generation.

According to one embodiment, power is extracted from the wind turbine under control of the operator even though the frequency of the network has not changed. During certain high power demand situations, for example in the evening at supper time if many homes are turning on lights and electric ovens, the wind farm can be managed to have each wind turbine output a surge of power for about 10 seconds, and then a second wind turbine and then a third, etc. so that over the period of half and hour or one hour, each wind turbine in the entire wind farm provides in sequence a 10%-20% surge of power to boost the overall power output of the entire windfarm for that one hour higher than would be possible in theory, based on the wind speed. Then, at the end of this time, particularly in the evening when less power is consumed by the homes, the wind turbine blades can regain the energy and return to full rotational speed with a lower exciter current.

This alternative embodiment is particularly beneficial when high power use periods are followed by low power consumption. For example, from 7:00-8:00 p.m. has a relatively high power consumption, but from midnight to 3:00 am. power consumption is quite low. Similarly, right at breakfast time as coffee is being made, lights are first turned on and right at noon in some communities when everyone go inside for lunch, a brief power surge of about 30 min is needed, followed by a quiet time in which power consumption may drop by half. In the past, these variations in power had to be provided by changes in power output from nuclear plants, hydro plants, coal fired plants and the like, but with this invention, the sum the inertia from all wind turbines in a large wind farm over several hundred wind turbines will exceed the extra power needed. Therefore, under the control of an operator or computer control system, the wind farm is managed to transfer the inertia of the many rotor assemblies of the large group of wind turbines into electric power and then provide this extra power to the network at a time of high need, which will then be followed by a reduced power output while the wind turbines restore their inertia as they extract power from the wind as it continues to blow. Thus, while one embodiment is to provide the power surge based on sensing a frequency drop in the power grid to aid to restore the system, another embodiment which is quite separate is to provide the power surge under control of an operator or master computer system which has the ability to manage power production from a variety of sources.

The rate and amount of electric power that is extracted from the inertia of the rotating components can vary based on the rate and amount of change in exciter current under control of the main control 20. The tables that follow at the end of the text provide various examples.

The behavior according to the invention of the wind power installation however in particular has the result that the critical under frequency situations are successfully managed or successfully bridged over by existing wind power installations so that further network management interventions can be initiated within the critical period of time of for example 1 to 8 sec, in particular 1 to 3 sec, after the occurrence of the under frequency situation, and such network management interventions, after the wind power installation or installations (or entire wind park) has or have fed its or their additional power into the network, intervene in the action thereof and successfully support the network. If the under frequency continues for longer than a preset time, such as 10 seconds and the action of other plants, such as other wind power installation, hydro plants, nuclear power plants and the like are not able to bring the frequency back to within the deadband, or if the frequency drops well below the control band, the wind turbine will first try to supply power at the current network frequency, even though it is below the desired value. If the network frequency continues to drop or stays low for too long, the wind turbine will separate from the network and stop providing power to the network.

The technical availability of the power increase $P_{increase}$ in the case of a network underfrequency is fundamentally given as from an instantaneous power $P_{actual}$ of 4% of the rated power. A power increase $P_{increase}$ by 10% with respect to the rated power is then possible. A power increase of 200 kW for a wind power installation by way of example is illustrated in principle hereinafter in FIGS. 5 to 8. In this case 200 kW constitute 10% of the rated power. In principle, it is possible to select between two options for the behavior in respect of the power increase during frequency support, namely between a frequency-dependent power increase as shown in FIG. 5 and a frequency-dependent and rotary speed-dependent power increase as shown in FIG. 6.

An embodiment which can also be described by reference to FIG. 4 and the values of which are specified in FIG. 4 can be described as follows.

In the case of frequency changes to below the deadband the required power increase occurs with a fixed gradient of about 250 kW/s. A power increase $P_{increase}$ of up to 10% of the rated power of the wind power installation (WPI) is achieved after about 80 ms. In the case of small frequency changes within the control band and in the power range below 500 kW the power gradient is slightly reduced by the generator-induced behavior upon power changes. The power increase $P_{increase}$ is available over a time of a maximum of 6.4 s. After at the latest 7 s the effective power of the WPI is set to the normal working point again at 250 kW/s. The control stabilization time is dependent on the wind conditions and the installation rotary speed which is set during the implementation time. The transition to the feed of power into the network in normal operation is concluded in about 1 s.

Figure 5:
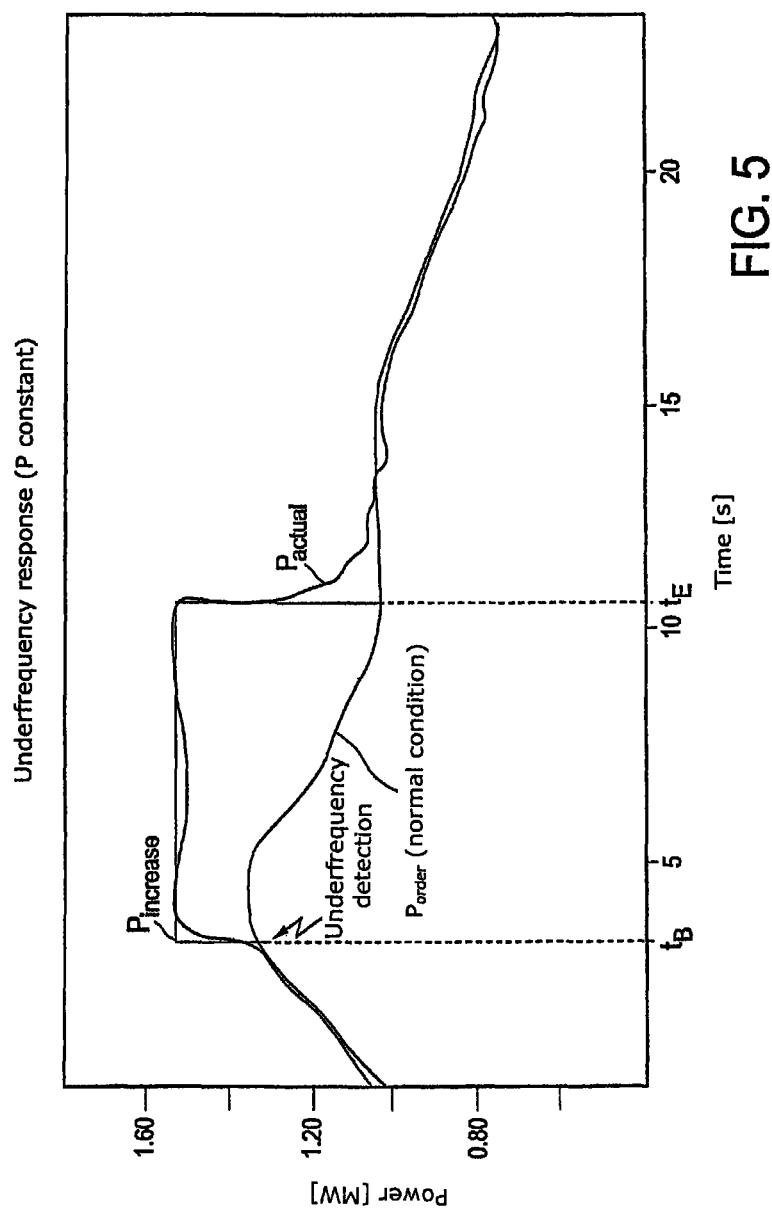
FIG. 5 shows an example illustrating power configurations for a constant power increase.
Figure 6:
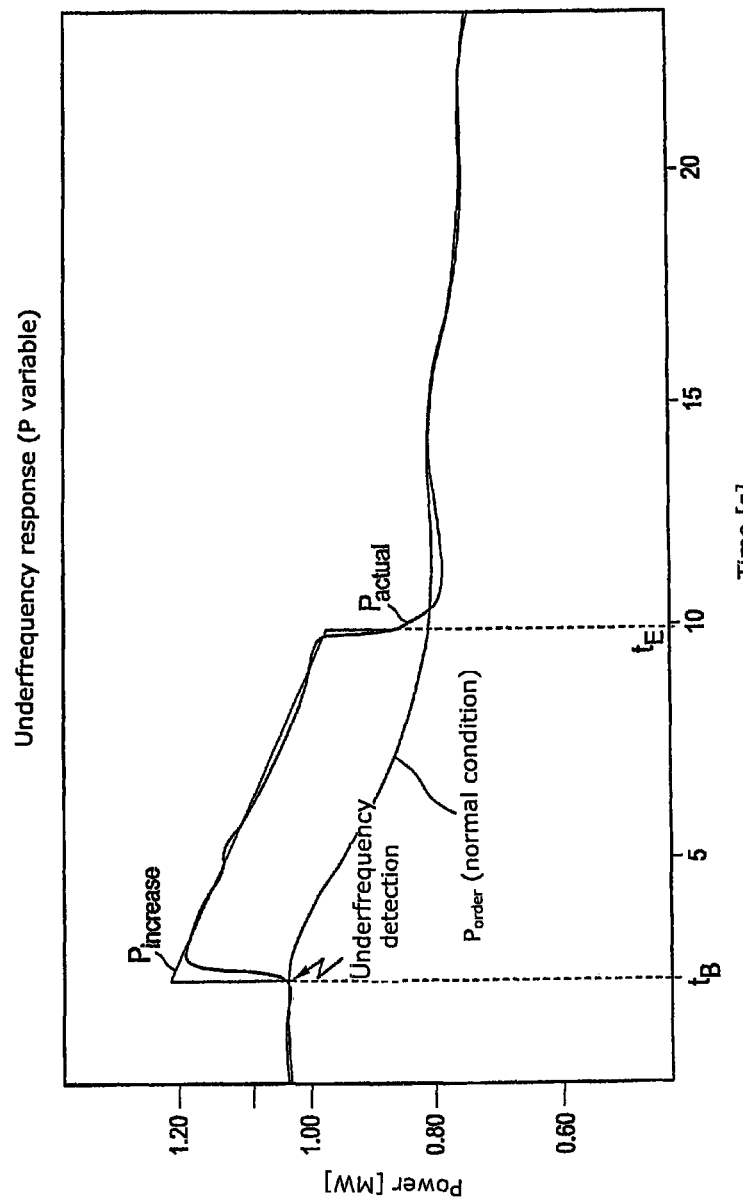
FIG. 6 shows an example illustrating power configurations in the event of a power increase which is effected in dependence on the rotary speed of the rotor.

FIG. 5 shows a target power $P_{order}$ in relation to time for the situation where no power increase would be implemented. That curve is also included for the purposes of comparison. An underfrequency is detected at the time $t_8$ in FIG. 5 and a power increase of 200 kW is predetermined. That power curve which is basically represented in an angular configuration is identified by $P_{increase}$. That power $P_{increase}$ rises at the time $t_B$ to that value increased by 200 kW and keeps that value constant until the end time $t_E$ and then falls to the value of the normal power target curve $P_{order}$. The normal power curve $P_{order}$ has in the meantime fallen away without that having an influence on the curve $P_{increase}$. The time between the initial time $t_B$ and the end time $t_E$ is about 8 sec. In addition, a power curve $P_{actual}$ is also shown, corresponding to the actually achieved value of the power fed into the network. As shown in FIG. 5 therefore the power increase $P_{increase}$ over the preset implementation time $t_{max}$ is proportional to the network frequency. That corresponds to a power delivery independently of the rotary speed of the rotor of the wind power installation, that occurs.

The following should also be additionally explained in relation to FIG. 5: the power of the wind power installation only depends on the network frequency during frequency support. In addition, the power increase $P_{increase}$ which is required proportionally to the frequency deviation occurs over the preset implementation time $t_{max}$. The total effective power delivery $P_{actual}$ is thus the total of the power in accordance with the rotary speed-power characteristic at the moment in time of activation of inertia emulation and required power increase $P_{increase}$. The overall effective power delivery is delimited by the maximum apparent power of the wind power installation. Those limits of the wind power installation configurations are shown in the power diagrams in illustrations 7 to 10.

In regard to the frequency-dependent and rotary speed-dependent power increase as shown in FIG. 6 the power increase achieved, in relation to the preset implementation time, is proportional to the network frequency and also varies in dependence on the rotary speed that is set in respect of the rotor. In dependence on the wind speed and the rotor rotary speed, the power increase is provided adapted to the rotary speed. The nomenclature used in FIG. 6 corresponds to that in FIG. 5 and an underfrequency is detected at the time $t_B$ and the power increase by about 200 kW is effected. In the further variation up to the end time $t_E$ the rotary speed decreases and therewith also the target power, without having regard to a power increase, namely $P_{order}$. The power increase $P_{increase}$ maintains approximately a value of 200 kW above the respective current target power $P_{order}$. At the time $t_E$ the power increase is then ended and the power $P_{actual}$ falls to the value of the target power $P_{order}$.

In addition as an explanation relating to FIG. 6 attention is directed to the following: the power of the wind power installation remains controlled during frequency support with the predetermined rotary speed-power characteristic in dependence on the wind speed. The overall effective power delivery $P_{actual}$ over the preset implementation time $t_{max}$ is thus the sum of the currently prevailing rotary speed-dependent power P and the power increase $P_{increase}$ required proportionally to the frequency deviation.

Figure 7:
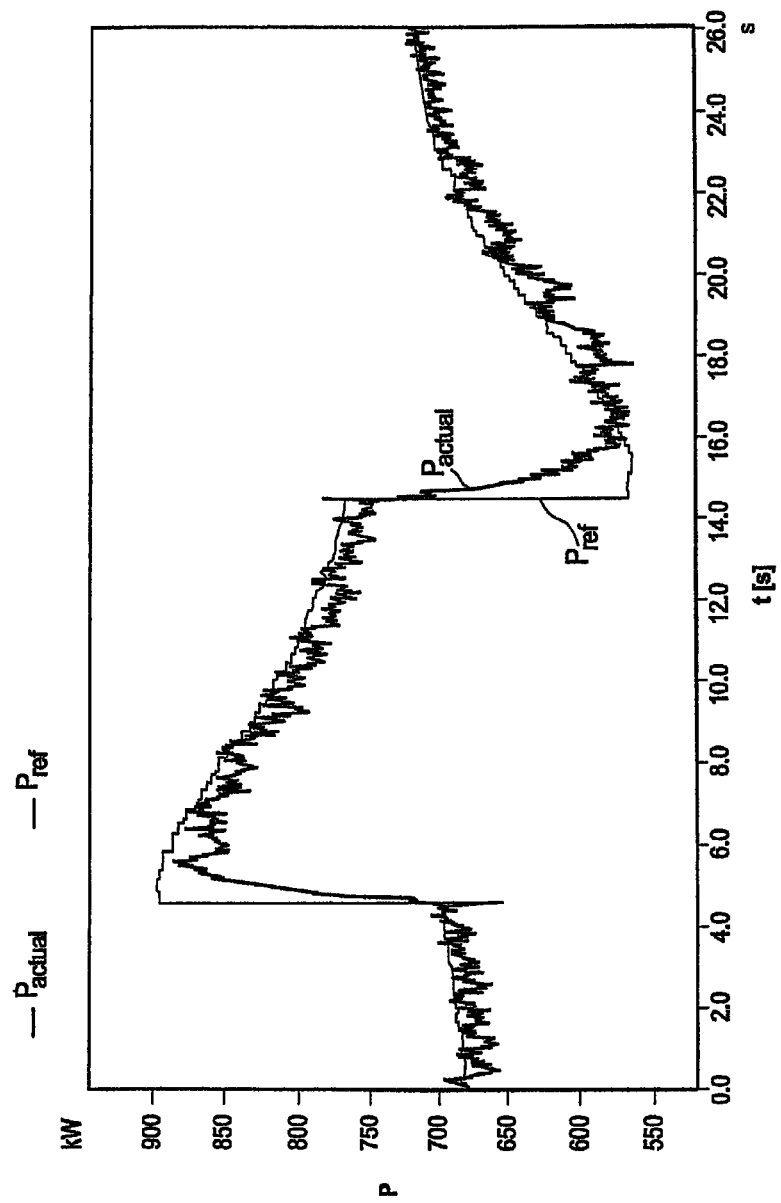
FIG. 7 shows an example illustrating measurement of a power in the case of a power increase dependent on the rotary speed of the rotor.
Figure 8:
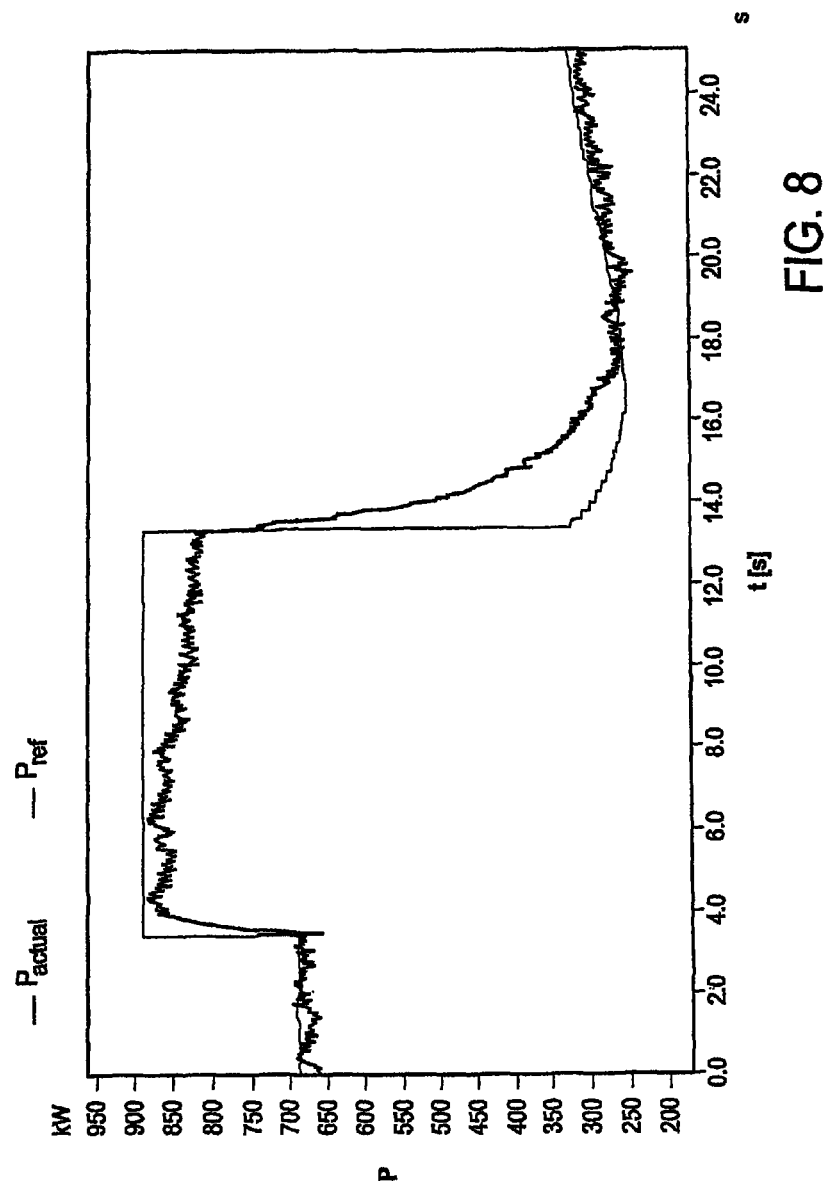
FIG. 8 shows measurement of a power with a constant power increase.

FIGS. 7 and 8 show measurements or recordings, corresponding to FIGS. 6 and 5, of the power target value $P_{ref}$ and the actually set power value $P_{actual}$. In that respect the power target value $P_{ref}$ concerns the target power, having regard to the power increase. The power configurations shown in FIG. 7 correspond in that respect to a frequency-dependent and rotary speed-dependent power increase, similarly to that shown in FIG. 6. The power configurations shown in FIG. 8 correspond to an only frequency-dependent power increase, similarly to that shown in FIG. 5. It is to be observed that FIGS. 5 to 8 however each represent their own specific configurations.

Figure 9:
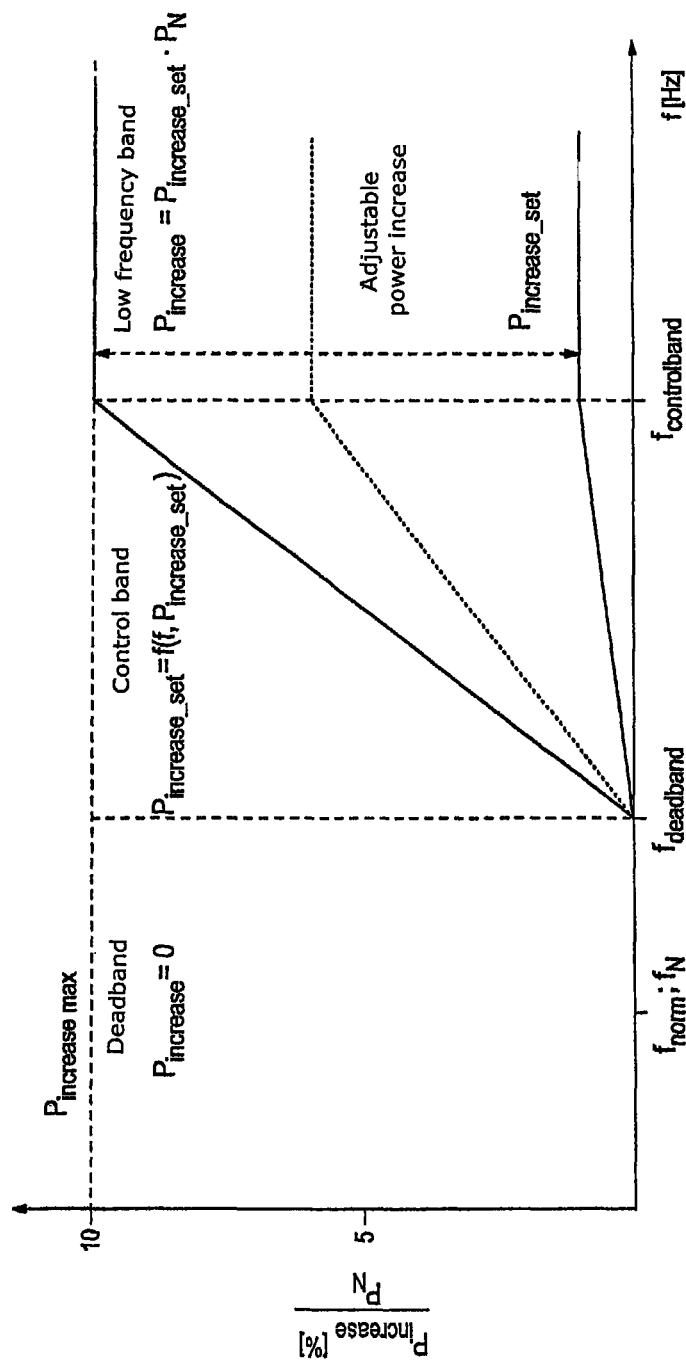
FIG. 9 shows possible variations in the power values by which a power increase is to be implemented in dependence on the frequency and for different adjustable maximum values in respect of the power increase.

FIG. 9 in relation to an embodiment shows various possible frequency-dependent increases of $P_{increase}$ in dependence on the selected value of $P_{increase\_set}$. The three curves by way of example are identified by $P_{increase'}$, $P_{increase''}$ and $P_{increase'''}$.

The additional power $P_{increase}$ is proportionally dependent on the measured frequency deviation below the deadband frequency. The power increase is increased linearly as from the deadband frequency $f_{deadband}$ of 0% to the preset power increase $P_{increase\_set}$ upon reaching the control band frequency $f_{deadband}$. In addition, when required by the network provider, the preset power increase $P_{increase\_set}$ can be predetermined in 1% steps of the rated power to the maximum permissible power increase $P_{increase\_max}$, from the rated power. $P_{increase\_set}$ is also not exceeded in the event of a major frequency deviation. Frequency changes occurring during the implementation time cause direct adaptations in respect of the power increase.

The rapid increase in power output can be triggered based on the frequency of the electrical network dropping by a threshold amount. This threshold amount can be measured by a number of different techniques within the scope of this invention. One technique is a percentage drop from the target value, such as 0.1%, 0.2%, 0.3%, etc., as stated elsewhere herein. Another technique is an absolute value drop in frequency, such as a drop of 0.5 Hz, 1.0 Hz, 1.5 Hz, etc., as stated elsewhere herein. Yet a third technique is a rate of drop over time, for example, a drop of greater than 0.3 Hz over less than 0.02 seconds. Namely, the system may be set to trigger on an absolute value drop of 1.0 Hz, and also may trigger on a drop of less, such as 0.1 Hz or 0.3 Hz if it occurs rapidly, such as over 0.02 seconds or 0.04 seconds.

The ratio $P_{increase}/P_{rated}$ in % can be illustrated, in dependence on the actual frequency or measured frequency $f_{meas}$ and in dependence on the value $P_{increase\_set}$ which is specified in %, with the following formula:

$$(P_{increase}/P_{rated})[\%] = ((f_{deadband} - f_{meas})/(f_{deadband} - f_{controlband})) \times P_{increase\_set}[\%]$$

Table 1 specifies characteristic values or setting ranges for an installation by way of example. In principle the deadband frequency can be identified as $f_{deadband}$ and the control band frequency as $f_{controlband}$. The power increase can be identified as $P_{increase}$ or $P_{extra}$ and the rated power as $P_N$ or $P_{rated}$. In the line 'maximum power increase' it is possible to select between the use $P_{extra}$=constant or $P_{extra}$=variable, in dependence on whether a frequency-dependent power increase or a frequency-dependent and rotary speed-dependent power increase is to be used.

TABLE 1

| Frequency measurement | | | |
|---|---|---|---|
| Frequency resolution | | 0.01 Hz | |
| Frequency accuracy | | 0.004 Hz | |
| Frequency recognition | | t = 0.02 s | |
| Frequency measurement range | | 40-70 Hz | |
| Frequency range | | 50 Hz network | 60 Hz network |
| | Maximum frequency | $f_{max}$ = 57 Hz | $f_{max}$ = 67 Hz |
| | Rated frequency | $f_{rated}$ = 50 Hz | $f_{rated}$ = 60 Hz |
| | Minimum frequency | $f_{min}$ = 43 Hz | $f_{min}$ = 53 Hz |
| Inertia emulation at under frequency | | | |
| Maximum implementation time of the increase | | 8 s | |
| Detection time | | 0.02 s | |
| | | 50 Hz network | 60 Hz network |
| Deadband frequency $f_{deadband}$ | | 49-50 Hz | 59-60 Hz |
| Control band frequency $f_{controlband}$ | | 47-50 Hz | 57-60 Hz |
| Power increase | | | |
| Power increase $P_{increase\ set}$ | | 0-10% with respect to $P_{rated}$ | |
| Max. power increase $P_{increase\ max}$ | | 10% with respect to $P_{rated}$ | |
| Setting option | | In steps of 1% with respect to $P_{rated}$ | |
| | Normal power | Additional power | |
| Max. power increase | from 0% to 4% $P_{rated}$ | $P_{extra} \approx 0$ | |
| | from 4% to 100% $P_{rated}$ $P_{extra}$ = const | $P_{extra} \leq$ 10% $P_{rated}$ | |
| | from 4% to 100% $P_{rated}$ $P_{extra}$ = variable | $P_{extra} \leq$ 10% $P_{rated}$ | |
| Gradient of the power change dP/dt | | ≈250 kW/s | |
| Recognition time | | 0.02 s | |
| Rise time [for 200 kW] | | ≈ 0.8 s | |
| Fall time or control stabilization time s. above | | ≤1.0 s | |
| Waiting time to next increase | | ≥2 × maximum duration of the increase | |

If the network frequency falls below a set value, for example 1 Hz or 2 Hz, the main control unit 20 can cause the inverter 14 to output power onto the network at its then current frequency namely 1 Hz or 2 Hz below normal, until the frequency of the network returns to the normal value, at which time the main control 20 will cause the inverter to match the normal frequency as it outputs power.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wind power installation, wherein the wind power installation is connected to an electrical supply network and in operation or when wind prevails above an initial speed and below a switch-off speed, the wind power installation feeds electrical energy into the supply network, and the electrical energy has a frequency and voltage desired or required by the supply network, wherein in operation of the wind power installation above its rated value or below a switch-off speed a rotor of the wind power installation that has at least one rotor blade that rotates, and connected to the rotor of the wind power installation is a generator driven by the rotor thereby to generate electrical energy, the method comprising:

measuring the frequency prevailing in the electrical supply network;

transmitting the measured network frequency to a control device for controlling operation of the wind power installation; and controlling for a limited period, the power delivered by the generator of the wind power installation above the currently prevailing power of the wind power installation when the network frequency of the supply network is below a target frequency of the supply network by a predetermined frequency value or when the network frequency falls with a frequency gradient greater than a threshold value, wherein the frequency gradient is a change in relation to time that exceeds a predetermined amount of change, wherein controlling comprises:
  in a deadband range, wherein the network frequency is in a frequency range between a rated frequency for the supply network and a deadband frequency, the power is not increased,
  in a control-band range, wherein the network frequency is in a frequency range between the deadband frequency and a control-band frequency, the power is increased based on a frequency deviation of the network frequency from the deadband frequency, and
  in an under-frequency range, wherein the network frequency is less than the control-band frequency, the power is increased by a preset power that is a maximum power increase supplied in the control-band range and determined based on a maximum frequency deviation in the control-band range.

2. The method according to claim 1 wherein the predetermined frequency value is within the range of greater than 0.1% and less than 2% of the network target frequency.

3. The method according to claim 1 wherein the power increase is effected utilizing rotational energy stored in the moment of inertia of the rotor of the wind power installation.

4. The method according to claim 1 wherein the frequency of the power fed into the network always corresponds to the currently prevailing network frequency, that is to say the power which is fed in set to a frequency below the network frequency if the network frequency is less than the target value of the network frequency.

5. The method according to claim 1 wherein the increase in power is effected above the rated power, when the feed was previously effected with a rated power.

6. The method according to claim 1 wherein within a threshold period of time after the frequency value falls below the predetermined frequency value of the network frequency or after the predetermined amount of change is exceeded, the power increase is effected.

7. The method of controlling a wind park comprising at least two wind power installations, in which each wind power installation is controlled in accordance with a method according to claim 1,
  wherein the increase in the power to be delivered to the network from all wind power installations is unitarily and/or centrally controlled.

8. A wind power installation adapted to carry out the method according to claim 1.

9. A wind park wherein the wind park includes a plurality of wind power installations adapted to carry out a method according to claim 7.

10. The method according to claim 1 wherein the predetermined frequency value is within the range of 0.1 Hz and 1.0 Hz.

11. The method according to claim 1 wherein the predetermined amount of change is in the range of 0.5 Hz/second to 2 Hz/second.

12. The method according to claim 6 wherein the threshold period of time is 10 to 1000 ms after the frequency value falls below the predetermined frequency value of the network frequency.

13. The method according to claim 6 wherein the threshold period of time is within the range of 50 to 100 ms, after the frequency value falls below the predetermined frequency value of the network frequency.

14. The method according to claim 6 wherein the increased power is provided for a threshold amount of time.

15. The method according to claim 14 wherein the threshold amount of time is in the range of 0.5 seconds to 30 seconds.

16. The method according to claim 14 wherein the threshold amount of time is in the range of 1 second to 10 seconds.

17. A method of providing increased power to an electrical network from a wind power installation comprising:
  sensing a network frequency of the electrical network;
  determining whether the network frequency falls within a deadband range in which the network frequency is in a frequency range between a rated frequency for the network and a deadband frequency, in a control-band range, wherein the network frequency is in a frequency range between the deadband frequency and a control-band frequency, or in an under-frequency range, wherein the network frequency is less than the control-band frequency, an exciter current is increased by a preset power;
  increasing the exciter current of a generator of the wind power installation within a selected time period when the network frequency falls greater than a threshold value; and
  extracting for a period of time more power from wind power installation than the current power being produced without a corresponding increase in the wind speed, wherein when the network frequency is in the deadband range, the more power is not extracted, wherein when the network frequency is in the control-band range, the more power is extracted based on a frequency deviation of the network frequency from the deadband frequency, and wherein when the network frequency is in the under-frequency range, the more power is extracted by the preset power that is a maximum extracted power in the control-band range and determined based on a maximum frequency deviation in the control-band range.

18. The method according to claim 17 wherein the threshold value is a percentage of the normal network frequency.

19. The method according to claim 18 wherein the threshold value is in the range of 0.2% and 3.0% of the normal network frequency.

20. The method according to claim 17 wherein the threshold value is a rate of decline over time from the normal network frequency.

21. The method according to claim 17 wherein the selected time period is within the range of 0.02 seconds and 1 second.

22. The method of according to claim 17 wherein the selected time period is within the range of 2 seconds to 12 seconds.

23. The method according to claim 22 wherein the selected time period is less than 8 seconds.

24. A method of controlling a single wind turbine comprising:
  producing a selected amount of power from the wind turbine based at least in part on the rotation speed of a rotor mechanism as driven by the wind;
  outputting the selected amount of power from the wind turbine onto an electrical network;
  sensing the frequency of the electrical network onto which the selected amount of power is being output; and
  controlling an amount of electrical power output from the wind turbine to the electrical network when the frequency of the network falls below a selected value by converting some of the inertia in the rotor mechanism to electrical power, thus briefly reducing its rotation speed, wherein:
  in a deadband range, wherein the network frequency is in a frequency range between a rated frequency for the network and a deadband frequency, the electrical power output from the wind turbine to the electrical network is not increased, in a control-band range, wherein the network frequency is in a frequency range between the deadband frequency and a control-band frequency, the electrical power output from the wind turbine to the electrical network is increased based on a frequency deviation of the network frequency from the deadband frequency, and in an under-frequency range, wherein the network frequency is less than the control-band frequency, the electrical power output from the wind turbine to the electrical network is increased by a preset power that is a maximum power increase supplied in the control-band range and determined based on a maximum frequency deviation in the control-band range.

* * * * *